(12) United States Patent
Park et al.

(10) Patent No.: US 9,904,143 B2
(45) Date of Patent: Feb. 27, 2018

(54) HOLOGRAM DISPLAY APPARATUS AND METHOD FOR CONTROLLING THE SAME

(71) Applicant: LG DISPLAY CO., LTD., Seoul (KR)

(72) Inventors: JuSeong Park, Goyang-si (KR); DongYeon Kim, Busan (KR)

(73) Assignee: LG DISPLAY CO., LTD., Seoul (KR)

(*) Notice: Subject to any disclaimer, the term of this patent is extended or adjusted under 35 U.S.C. 154(b) by 238 days.

(21) Appl. No.: 14/699,689

(22) Filed: Apr. 29, 2015

(65) Prior Publication Data

US 2016/0187851 A1 Jun. 30, 2016

(30) Foreign Application Priority Data

Dec. 31, 2014 (KR) .................. 10-2014-0195730

(51) Int. Cl.
*G02F 1/31* (2006.01)
*G03H 1/22* (2006.01)

(52) U.S. Cl.
CPC ............ *G02F 1/31* (2013.01); *G03H 1/2205* (2013.01); *G03H 1/2286* (2013.01); *G03H 1/2294* (2013.01); *G03H 2001/2239* (2013.01); *G03H 2001/2242* (2013.01); *G03H 2223/18* (2013.01); *G03H 2226/05* (2013.01)

(58) Field of Classification Search
CPC ............... G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011
See application file for complete search history.

(56) References Cited

U.S. PATENT DOCUMENTS

2014/0016051 A1* 1/2014 Kroll ................. G03H 1/22
349/15

* cited by examiner

*Primary Examiner* — Jennifer L. Doak
(74) *Attorney, Agent, or Firm* — Dentons US LLP

(57) ABSTRACT

Provided is a hologram display apparatus according to an exemplary embodiment of the present invention. The hologram display apparatus includes: a detector configured to detect a position of a viewer; and a spatial light modulation panel that modulates a light to display a hologram. Further, a grade is determined on the basis of the detected position of the viewer. An optical path switching unit refracts the light from the spatial light modulation panel with the determined grade. A laser source of the hologram display apparatus generates the light with a compensated output on the basis of the grade.

18 Claims, 11 Drawing Sheets

HOLOGRAM DISPLAY APPARATUS AND METHOD FOR CONTROLLING THE SAME

CROSS-REFERENCE TO RELATED APPLICATIONS

This application claims the priority of Korean Patent Application No. 2014-0195730, filed on Dec. 31, 2014, in the Korean Intellectual Property Office, which is incorporated by reference for all purposes as if fully set forth herein.

BACKGROUND OF THE INVENTION

Field of the Invention

The present invention relates to a hologram display apparatus and a method for controlling the same. More particularly, the invention relates to a hologram display apparatus having improved reliability by minimizing a deviation between luminance recognized by the left eye and luminance recognized by the right eye, and a method for controlling the same.

Discussion of the Related Art

There has been an increased interest in three-dimensional image display technology. One of the representative methods for displaying a three-dimensional image is a stereoscopic method. The stereoscopic method uses a disparity image between the left and right eyes to apply 3-D effects. Such a binocular disparity image can be generated using glasses.

The biggest problem of the stereoscopic method is that it is necessary for the user to wear glasses. Therefore, an autostereoscopic method which does not require wearing glasses has been developed. A hologram display technology has been studied as technology for displaying a three-dimensional image without using glasses.

According to the hologram display technology, an interference signal obtained by overlapping light reflected from an object with a coherent light is recorded, and stored and a hologram is displayed using the interference signal. A hologram display apparatus stores an interference pattern formed by using the interference signal and restores the interference signal by irradiating a reference light to the stored interference pattern, so that a three-dimensional hologram is displayed.

In the hologram display technology, an interference pattern may be generated by a computer. A hologram can be displayed by displaying an interference pattern on a liquid crystal spatial light modulator and irradiating a reference light to the liquid crystal spatial light modulator.

However, a spatial light modulator using a liquid crystal has too large a gap between pixels and thus has a very small angle of diffraction. Therefore, a problem of the spatial light modulator using a liquid crystal is a very narrow viewing window that may prevent the recognition of a hologram.

SUMMARY OF THE INVENTION

Accordingly, the present invention is directed to a hologram display apparatus and method for controlling the same that substantially obviates one or more of the problems due to limitations and disadvantages of the related art.

In order to widen a narrow viewing window, there may be provided a prism which dynamically operates to detect a position of a viewer and refract light according to the detected position. The viewing window that enables the viewer to view a hologram can be further widened by the prism which is dynamically operated. Also, the light can be refracted through the prism with grades respectively optimized for the left eye and the right eye on the basis of the position of the viewer.

However, in a structure where a prism is provided to widen a viewing window, light may progress through the prism in a different direction toward a position of a viewer, and, thus, a loss of light may occur. Further, the prism refracts light with different grades for the left eye and the right eye, respectively, and, thus, an amount of light lost in each of the left eye and the right eye may be different.

Therefore, as there may be a difference in an amount of light incident in each of the left eye and the right eye by refraction of light through the prism, visibility of a recognized hologram may decrease.

The inventors of the present invention recognized that in a hologram display apparatus adopting a dynamic prism formed of a liquid crystal, an amount of light loss is different for each of the left eye and the right eye due to disposition of the liquid crystal.

Accordingly, an advantage of the present invention is to provide a hologram display apparatus which adopts a dynamic prism and enables recognition of a uniform amount of light by the left eye and the right eye, and a method for controlling the same.

Another advantage of the present invention is to provide a hologram display apparatus which enables recognition of a uniform amount of light by the left eye and the right eye and has a wide viewing window, resulting in an improvement of reliability, and a method for controlling the same.

The advantages of the present invention are not limited to the aforementioned advantages, and other advantages, which are not mentioned above, will be apparent to a person having ordinary skill in the art from the following description.

According to an aspect of the present invention to achieve the above-described advantages, there is provided a hologram display apparatus that includes a detector configured to detect a position of a viewer; and a spatial light modulation panel that modulates light to display a hologram. Further, a grade is determined on the basis of the detected position of the viewer. An optical path switching unit refracts the light with the determined grade. A laser source of the hologram display apparatus generates the light with a compensated output on the basis of the grade.

Herein, the grade includes a left eye-grade for the left eye of the viewer and a right eye-grade for the right eye of the viewer, and the optical path switching unit may refract the light with each of the left eye-grade and the right eye-grade. Further, the left eye-grade and the right eye-grade may be different from each other.

A compensated output from the laser source on the basis of the left eye-grade and a compensated output from the laser source on the basis of the right eye-grade may be different from each other. The output corresponding to the grade may be determined by using an output look-up table of the laser source. As the grade increases, the output may be further compensated. Regarding compensation of an output, the laser source may compensate the output by adjusting a duty or a size.

In various exemplary embodiments, the optical path switching unit includes: a first substrate; a second substrate facing the first substrate; driving electrodes on the first substrate; common electrodes on the second substrate; and a liquid crystal unit interposed between the first substrate and the second substrate. Herein, the liquid crystal unit may be formed of liquid crystal molecules continuously arranged in the entire liquid crystal unit. When a voltage is applied to the driving electrodes and the common electrodes and an electric field is generated, the liquid crystal molecules may be arranged in multiple prism patterns according to the electric field.

According to another aspect of the present invention to achieve the above-described objects, there is provided a method for controlling a hologram display apparatus. In the method for controlling a hologram display apparatus, a position of a viewer is detected. Then, a grade for the left eye and a grade for the right eye are determined on the basis of the position of the viewer. A laser source is operated to generate light with compensated outputs on the basis of the determined grades, and a voltage is applied to an optical path switching unit so as to refract the light with the determined grades. Herein, as the grades increase, the more the laser source generates the light with further compensated outputs.

Details of other exemplary embodiments will be included in the detailed description of the invention and the accompanying drawings.

The present invention has an effect of providing a wide range for a viewer to view a displayed hologram by refracting light according to a position of the viewer and also providing a hologram to the left eye and the right eye with a uniform luminance even if the position of the viewer recedes from the center of a hologram display apparatus.

The effects of the present invention are not limited to the aforementioned effects, and other various effects are included in the present specification.

BRIEF DESCRIPTION OF THE DRAWINGS

The accompanying drawings, which are included to provide a further understanding of the invention and are incorporated in and constitute a part of this specification, illustrate embodiments of the invention and together with this description serve to explain the principles of the invention. In the drawings.

DETAILED DESCRIPTION OF THE ILLUSTRATED EMBODIMENTS

Figure 1:
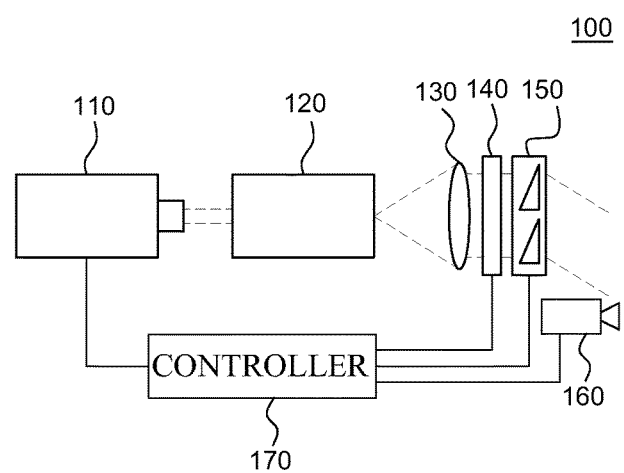
FIG. 1 is a schematic diagram illustrating a hologram display apparatus according to an exemplary embodiment of the present invention.

Advantages and features of the present invention, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined by the appended claims.

The shapes, sizes, ratios, angles, numbers, and the like illustrated in the accompanying drawings for describing the exemplary embodiments of the present invention are merely examples, and the present invention is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present invention.

Throughout the whole specification, the same reference numerals denote the same elements.

Since size and thickness of each component illustrated in the drawings are represented for convenience in explanation, the present invention is not necessarily limited to the illustrated size and thickness of each component.

The features of various embodiments of the present invention can be partially or entirely bonded to or combined with each other and can be interlocked and operated in technically various ways as can be fully understood by a person having ordinary skill in the art, and the embodiments can be carried out independently of or in association with each other.

Various exemplary embodiments of the present invention will be described in detail with reference to the accompanying drawings.

FIG. 1 is a schematic diagram illustrating a hologram display apparatus according to an exemplary embodiment of the present invention. Referring to FIG. 1, a hologram display apparatus 100 includes a laser source 110, an expander 120, a lens 130, a spatial light modulation panel 140, an optical path switching unit 150, a detector 160, and a controller 170.

The laser source 110 emits a reference light. The laser source 110 may provide a collimated light having a high coherence. The laser source 110 may be operated with a different output for each frame. For example, the laser source 110 may regulate an output by adjusting a duty or an amplitude.

The reference light emitted from the laser source 110 may pass through the expander 120 and the lens 130 in sequence so as to be uniformly projected onto the spatial light modulation panel 140. The reference light is projected onto the spatial light modulation panel 140. The reference light penetrating the spatial light modulation panel 140 having an interference pattern is refracted by the optical path switching unit 150 and then generates a hologram.

The optical path switching unit 150 transmits the light incident from the spatial light modulation panel 140 as it is, or refracts the light in a left or right direction using a prism pattern formed therein. Therefore, a hologram generated within a certain distance from the spatial light modulation panel 140 can refract light toward the left eye or the right eye of a viewer by using the optical path switching unit 150.

The controller 170 may refer to a processor capable of performing various operations. The controller 170 may be a combination of one or more operation devices such as a timing controller for controlling the spatial light modulation panel 140, a separate controller for controlling a grade prism arrays of the optical path switching unit 150 and an output from the laser source 110, an MAP (Multimedia Application Processor), an ISP (Image Signal Processor), and the like. Herein, a grade may mean an angle or a slope.

The controller 170 drives the spatial light modulation panel 140. The controller 170 may include a gate driving unit and a data driving unit. The data driving unit receives an input of hologram data from a storage unit and converts the hologram data into a positive/negative analog data voltage using a positive/negative gamma compensation voltage supplied from a gamma voltage generation circuit. The data driving unit supplies the positive/negative analog data voltage to data lines of the spatial light modulation panel 140. The gate driving unit supplies a gate pulse (or a scan pulse) synchronized with the data voltage to gate lines of the spatial light modulation panel 140 in sequence under the control of the controller 170.

The controller 170 supplies a gate driving unit control signal to the gate driving unit and also supplies the hologram data and a data driving unit control signal to the data driving unit. The gate driving unit control signal may include a gate start pulse, a gate shift clock, a gate output enable signal, and the like. The data driving unit control signal may include a source start pulse, a source sampling clock, a source output enable signal, a polar control signal, and the like.

The controller 170 supplies a driving voltage for driving the optical path switching unit 150 to the optical path switching unit 150. The driving voltage enables a hologram to be displayed according to a position of the viewer by adjusting a grade of the prism array formed within the optical path switching unit 150. The driving voltage may be formed of combinations of linearly increased or decreased voltages in order to regulate an arrangement direction of a liquid crystal molecule of a liquid crystal unit in a linear fashion.

The optical path switching unit 150 may include the detector 160. The detector 160 may be an imaging device.

The detector 160 photographs an image of the viewer and transmits the photographed image to the controller 170. The controller 170 compares calculated coordinates of the position of the viewer and a reference point and determines where the viewer is located with respect to the reference point.

Otherwise, the controller 170 analyzes the photographed image and calculates coordinates of the left eye and the right eye of the viewer. Alternatively, the controller 170 may calculate center coordinates of the position of the viewer and calculate coordinates of the left eye and the right eye on the basis of the center coordinates.

The controller 170 controls a unit for driving the optical path switching unit 150 according to the coordinates of the position of the viewer so as to form a prism pattern having a specific grade value in the optical path switching unit 150. If the viewer moves to the left with respect to the reference point, the unit for driving the optical path switching unit 150 forms the prism pattern within the optical path switching unit 150 in order to control the optical path switching unit 150 to refract an incident light to the left.

If a difference between the coordinates of the position of the viewer and the reference point is in a certain range, for example, it can be determined that the viewer is located at the reference point. Thus, the optical path switching unit 150 transmits the incident light as it is without forming a prism pattern.

The optical path switching unit 150 may be driven with multiple driving voltages that enable a prism pattern to have different grades for respective frames in order to respond to various positions of the viewer and a difference between the left eye and the right eye.

In the hologram display apparatus 100 according to the exemplary embodiment of the present invention, a reference light is refracted with different grades for the left eye and the right eye, respectively, to widen a viewing window through the optical path switching unit 150. The optical path switching unit 150 may be time-division driven in order for the light refracted with optimized grades to be recognized by the left eye and the right eye. For example, the optical path switching unit 150 may be driven at 120 Hz while refracting the light with a grade optimized for the left eye at a frequency of 60 Hz and the right eye at 60 Hz.

The reference light is refracted with different grades for the left eye and the right eye, respectively, and an amount of light loss from the optical path switching unit 150 may vary depending on a grade. The hologram display apparatus 100 according to the exemplary embodiment of the present invention can compensate the amount of light loss from the optical path switching unit 150 depending on a grade by regulating an output from the laser source 110. Therefore, even if the light is converted with different grades for the left eye and the right eye, respectively, the left eye and the right eye can recognize a hologram with a substantially uniform luminance.

Figure 2A:
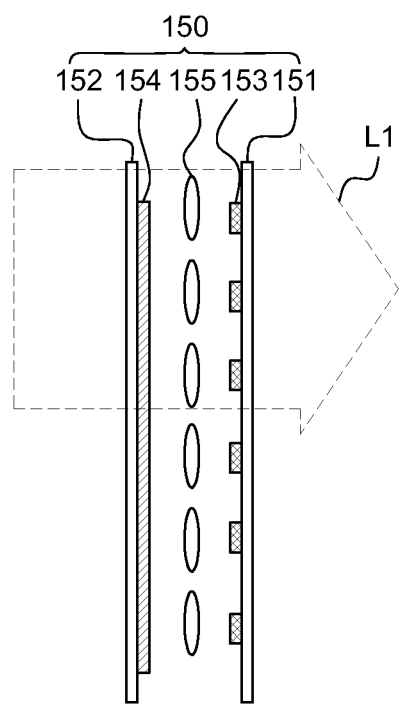
FIG. 2A and FIG. 2B are schematic cross-sectional views provided to describe an operation of a hologram display apparatus according to an exemplary embodiment of the present invention.
Figure 2B:
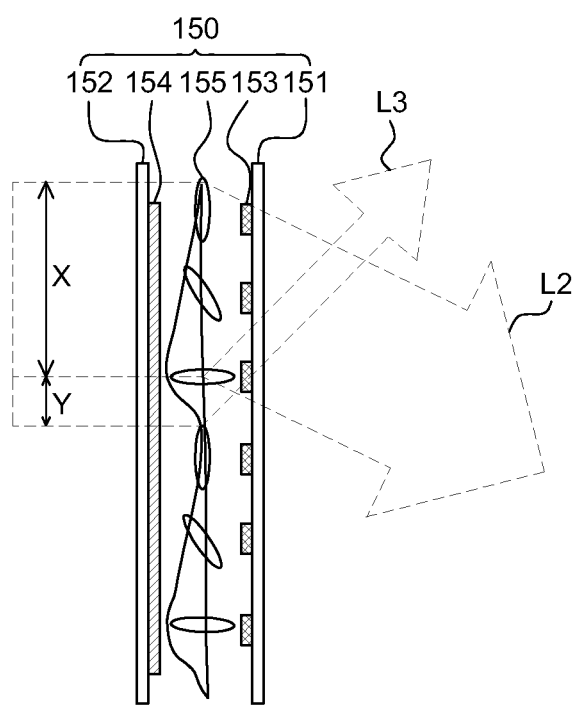

Hereinafter, an amount of light loss from the optical path switching unit 150 and a compensated output from the laser source 110 will be described in more detail. FIGS. 2A and 2B are schematic cross-sectional views provided to describe an operation of a hologram display apparatus according to an exemplary embodiment of the present invention.

Referring to FIGS. 2A and 2B, the optical path switching unit 150 includes a first substrate 151, a second substrate 152, driving electrodes 153, common electrodes 154, and a liquid crystal unit 155. In FIGS. 2A and 2B, the optical path switching unit 150 has a structure in which the liquid crystal unit 155 is interposed between the first substrate 151 and the second substrate 152.

The first substrate 151 is formed of a glass substrate or a plastic substrate and arranged in an outgoing direction of light passing through the optical path switching unit 150. The driving electrodes 153 are on the first substrate 151. The driving electrodes 153 may be formed of a transparent conductive material such as a transparent conductive oxide including ITO and IZO, and may be formed on the first substrate 151 by undergoing a photolithography process. The driving electrode 153 is elongated in one direction and separated from the adjacent driving electrode 153 with a uniform space therebetween, and may be in parallel with each other. The driving electrodes 153 may be covered and protected by a transparent protective layer. The protective layer may be formed of an inorganic material such as silicon oxide (SiOx) or silicon nitride.

The second substrate 152 is formed of a plastic substrate or a glass substrate in the same manner as the first substrate 151 and arranged to face the spatial light modulation panel 140. That is, the second substrate 152 is arranged in an incident direction of light to the optical path switching unit 150. The common electrodes 154 are disposed on the second substrate 152. Unlike the driving electrodes 153, the common electrodes 154 are on the entire surface of the second substrate 152. The common electrodes 154 may be formed of a transparent material such as a transparent conductive oxide including ITO and IZO in order to transmit light. The common electrode 154 may be covered and protected by a transparent protective layer. The protective layer may be formed of an inorganic material such as silicon oxide (SiOx) or silicon nitride.

The liquid crystal unit 155 is interposed between the first substrate 151 and the second substrate 152. The liquid crystal unit 155 is formed of liquid crystal molecules continuously disposed in the entire liquid crystal unit 155. The liquid crystal molecules are aligned in the same direction as an alignment film (not illustrated) formed within the first substrate 151 and the second substrate 152. Referring to FIG. 2A, the liquid crystal molecules are initially aligned with a major axis in parallel with the driving electrodes 153. Thus, before a voltage is applied to the driving electrodes 153 and the common electrodes 154, all of the liquid crystal molecules within the liquid crystal unit 155 are disposed in a state where the major axis is in parallel with the driving electrodes 153. If the liquid crystal molecules are disposed with the major axis in parallel with the driving electrodes 153, a light L1 passing through the light modulation panel penetrates the optical path switching unit 150. In this case, a penetration ratio is substantially equal to or higher than 90% and may be close to 100%.

If a voltage is applied to the driving electrodes 153 and the common electrodes 154, the liquid crystal molecules are disposed with the major axis in the same direction as an electric field. That is, the liquid crystal molecules are rotated 90 degrees between a horizontal direction and a vertical direction.

Referring to FIG. 2B, if a voltage is applied to the driving electrodes 153 and the common electrodes 154 and an electric field is generated, the liquid crystal molecules are disposed in multiple prism patterns according to the electric field. A prism pattern is generated by regulating an arrangement direction of liquid crystal molecules. The liquid crystal molecules are disposed between a state where the liquid crystal molecules are in parallel with the driving electrodes 153 and a state where the liquid crystal molecules are perpendicular to the driving electrodes 153. When the liquid crystal molecules are perpendicular to the driving electrodes 153, a refractive index is the lowest. When the liquid crystal molecules are in parallel with the driving electrodes 153, a refractive index is the highest. Accordingly, since the light emitted from the spatial light modulation panel 140 is a linearly polarized light, a refractive index varies depending on an arrangement direction of the liquid crystal molecules. That is, the liquid crystal molecules disposed perpendicular to a direction in which the light is linearly polarized have the lowest refractive index, but the liquid crystal molecules disposed in the direction parallel to the driving electrode 153 have the highest refractive index.

In FIG. 2B, a gradually increasing voltage is applied to each of the driving electrodes 153 disposed in parallel, so that a prism pattern is formed. For example, the lowest voltage is applied to the uppermost driving electrode 153, the second lowest voltage is applied to the second uppermost driving electrode 153, and a voltage that enables the liquid crystal molecules to be disposed in the same direction as the light is applied to the third uppermost driving electrode 153. In one embodiment, the voltage may range between 0 and 20 V while Vcom is set to 10V. In a section X between the first driving electrode 153 and the third driving electrode 153, a prism array may be defined. If a light L2 penetrates the prism array in the section X, the light L2 is refracted according to a grade of the prism array.

Meanwhile, the voltage applied to the first driving electrode 153 is also applied to the fourth driving electrode 153. However, an electric field generated between the third driving electrode 153 and the fourth driving electrode 153 is affected by an electric field generated between the third driving electrode 153 and the common electrode 154. Therefore, in a section Y between the third driving electrode 153 and the fourth driving electrode 153, a prism array is formed in the opposite direction of the prism array in the section X. A light L3 penetrating the prism array in the section Y is refracted in a different direction from a desired direction. Therefore, an amount of the light L3 penetrating the section Y is lost, and the section Y may be a light loss section.

Figure 3:
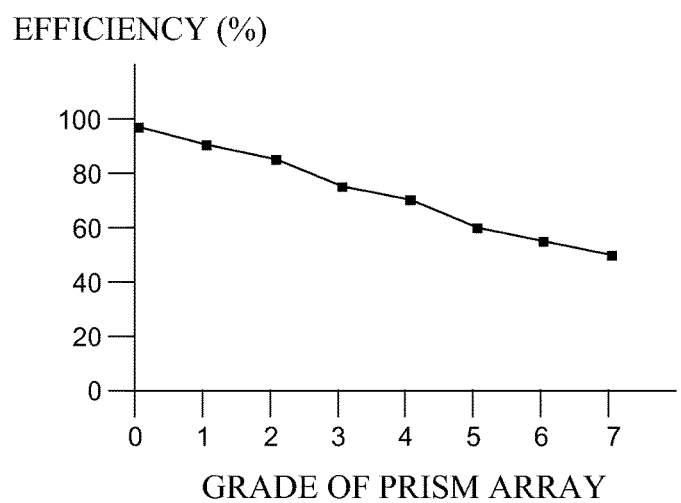
FIG. 3 is a graph provided to describe efficiency of an optical path switching unit depending on a grade of a prism array of a hologram display apparatus according to an exemplary embodiment of the present invention.

Further, the number of prism arrays formed within the optical path switching unit 150 may vary depending on a grade of a prism array in the section X. For example, when the prism array has a grade of 6, more prism arrays are formed within the optical path switching unit 150 as compared with a case where the prism array has a grade of 1. Therefore, an area of the light loss section Y between the third driving electrode 153 and the fourth driving electrode 153 is further increased. In one embodiment, the grade of a prism array may be determined empirically or the grade of a prism array may be determined based on the voltage applied to the driving electrode 153. FIG. 3 is a graph provided to describe efficiency of an optical path switching unit depending on a grade of a prism array of a hologram display apparatus according to an exemplary embodiment of the present invention. In FIG. 3, an X-axis represents a grade of a prism array formed within an optical path switching unit, and a Y-axis represents efficiency of the optical path switching unit in the unit of %. Herein, efficiency of light refers to a ratio of an amount of light refracted in a direction in which a viewing window is formed to have an amount of incident light. Referring to FIG. 3, when the prism array has a grade of 0, the efficiency is close to 100%. As a grade of the prism array is increased, the efficiency is decreased. When the prism array has a grade of 7, the efficiency is decreased to about 50%. This is because the number of prism arrays is increased and the area of the light loss section Y of FIG. 2B is increased as described above.

Further, as described above, the optical path switching unit is driven to refract light according to prism arrays having different grades for the right eye and the left eye. If lights having the same output are used, light of a non-uniform amount may be incident to each of the right eye and the left eye. If light of different amounts are recognized by the right eye and the left eye, respectively, a hologram cannot be clearly recognized, and, thus, reliability of the hologram display apparatus may decrease.

Figure 4:
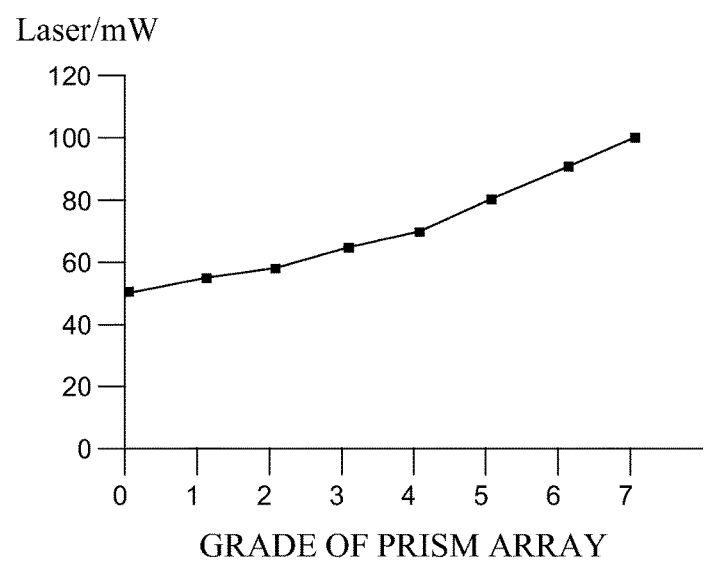
FIG. 4 is a graph provided to describe an output from a laser source depending on a grade of a prism array of a hologram display apparatus according to an exemplary embodiment of the present invention.

The hologram display apparatus according to the exemplary embodiment of the present invention adjusts an output from the laser source to be different for each of the right eye and the left eye. The output from the laser source may be adjusted according to a grade of a prism array. FIG. 4 is a graph provided to describe an output from a laser source depending on a grade of a prism array of a hologram display apparatus according to an exemplary embodiment of the present invention. In FIG. 4, an X-axis represents a grade of a prism array formed within an optical path switching unit, and a Y-axis represents an output from a laser source in the unit of mW per laser beam. If the prism array has a grade of 0, an output per laser beam from the laser source may be set to 50 mW. If a grade of the prism array is increased, the efficiency of the optical path switching unit is decreased. Thus, in order to compensate the above effect, the output from the laser source may be increased. The output from the laser source may be increased so as to correspond to the decreased efficiency of the optical path switching unit in FIG. 3. For example, while the grade of the prism array is increased from 0 to 7 in FIG. 3, the efficiency is halved from about 100% to 50%. Accordingly, the output per laser beam from the laser source in FIG. 4 may be increased from about 50 mW to about 100 mW.

Figure 5:
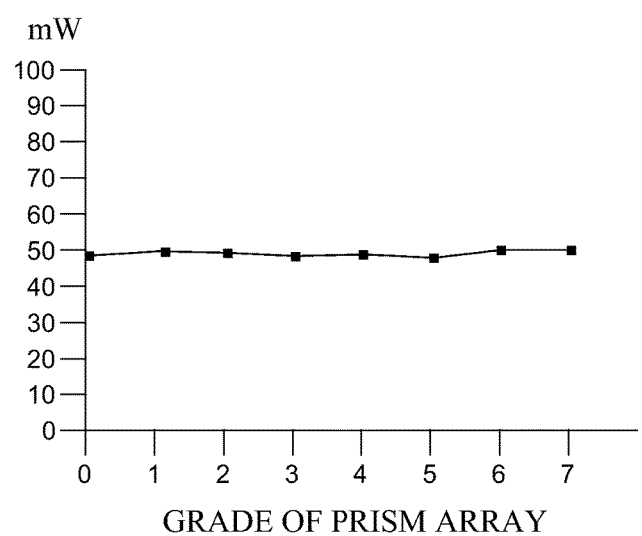
FIG. 5 is a graph provided to describe a final output luminance from a hologram display apparatus according to an exemplary embodiment of the present invention.

Even if the output from the laser source is increased, the efficiency of the optical path switching unit for forming a viewing window is decreased accordingly. Therefore, a final output of the light penetrating the optical path switching unit can be uniformly maintained at various angles. FIG. 5 is a graph provided to describe a final output from a hologram display apparatus according to an exemplary embodiment of the present invention. In FIG. 5, an X-axis represents a grade of a prism array, and a Y-axis represents an output of light refracted to a viewing window among light penetrating an optical path switching unit. If the prism array has a grade of 0 to 7, a final output of light from the hologram display apparatus is maintained at about 50 mW in the entire range.

In the hologram display apparatus according to the exemplary embodiment of the present invention, even if the prism array is set to have different grades for the right eye and the left eye, respectively, an output loss of light depending on a grade is compensated by regulating an output from the laser source. Therefore, even if a position of the viewer recedes from the center of the hologram display apparatus, it is possible to provide a hologram to the left eye and the right eye with a uniform luminance.

Figure 6:
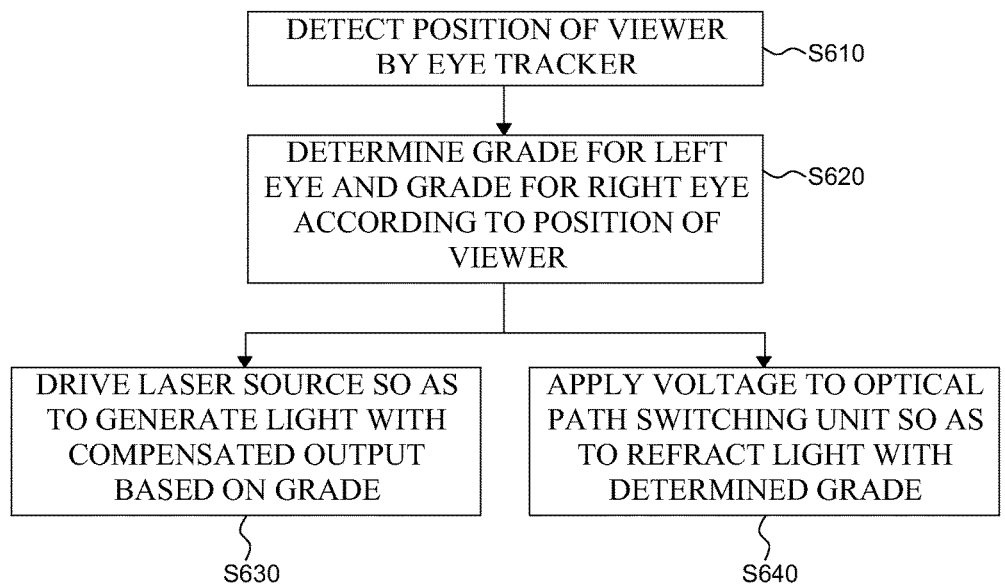
FIG. 6 is a flowchart provided to describe a method for controlling a hologram display apparatus according to an exemplary embodiment of the present invention.

FIG. 6 is a flowchart provided to describe a method for controlling a hologram display apparatus according to an exemplary embodiment of the present invention. First, a position of a viewer is detected by a detector (S610). Then, grades for the left eye and the right eye are determined according to the position of the viewer (S620). The grades for the left eye and the right eye are calculated based on the position of left and right eyes acquired by the detector. In one embodiment, the detector may detect the position of a viewer and the grades between the detector and the left and right eyes can be calculated by adding or subtracting some degree of grades to the position of the viewer. In other embodiments, the detector may be an eye tracker that can detect the position of the left and right eyes. The grades for the left eye and the right eye are used to determine a grade of a prism array within an optical path switching unit and also to compensate an output from a laser source. Therefore, the grades are transmitted to a controller that controls the optical path switching unit and may be transmitted to a controller that regulates the output from the laser source.

An output from the laser source may be determined using a look-up table. For example, if a grade of the prism array for the left eye is 2, an output from the laser source may be increased to 60 mW by 20% as illustrated in FIG. 4. Herein, 20% may correspond to a ratio of a light loss from the prism array. Further, if a grade of the prism array for the right eye is 5, an output from the laser source may be increased to about 80 mW by 60%.

Figure 7A:
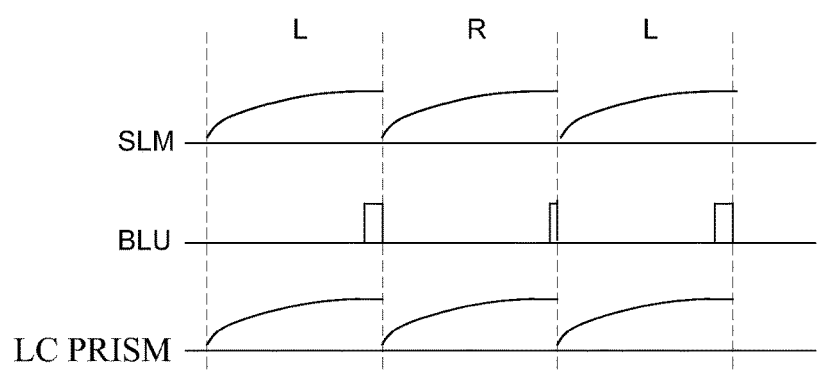
FIG. 7A and FIG. 7B are schematic timing diagrams provided to describe operations of a hologram display apparatus according to various exemplary embodiments of the present invention.
Figure 7B:
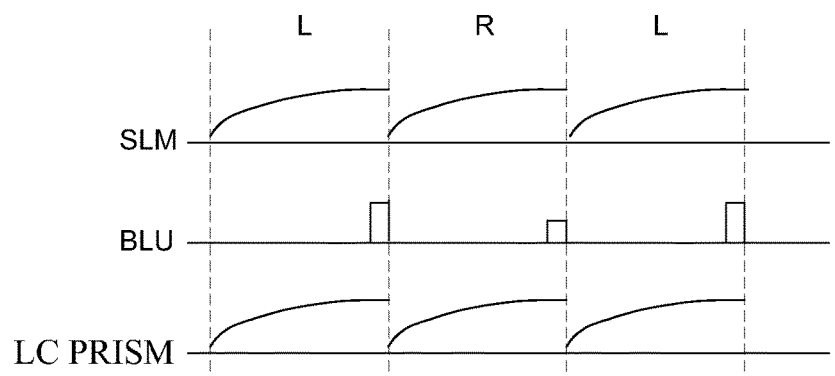

The laser source is driven to generate light with a compensated output on the basis of the grade of the prison array (S630). Further, a voltage is applied to the optical path switching unit so as to refract the light with the determined grade (S640). Herein, the laser source generates light with a further compensated output as the determined grade is increased. Also, the laser source may regulate an output in various ways. An output from the laser source may be regulated by adjusting, for example, a duty or a size. FIGS. 7A and 7B are schematic timing diagrams provided to describe operations of a hologram display apparatus according to various exemplary embodiments of the present invention.

FIG. 7A illustrates an exemplary embodiment of a laser source that regulates an output by adjusting a duty. Referring to FIG. 7A, timing diagrams of a spatial light modulation panel SLM, a laser source BLU, and a prism array (LC prism) within an optical path switching unit for two left eye frames L and a right eye frame R is illustrated. A disposition of liquid crystal molecules in the spatial light modulation panel SLM and the prism array (LC prism) in a single frame reaches a desired level with the passage of enough time. Therefore, the laser source BLU generates light from an end of the single frame.

In the right eye frame R, for example, the laser source BLU has a duty of about 10% according to a grade of 0 for the right eye. Further, in the left eye frame L, for example, the laser source BLU is driven at a duty of about 20% according to a grade of 7 for the left eye. However, if a duty is increased without limitation in order to regulate an output to reach a desired level, the laser source BLU may generate light before the disposition of the liquid crystal molecules reaches the desired level as described above. Therefore, the output from the laser source may be regulated by adjusting an amplitude.

Referring to FIG. 7B, in the right eye frame R, for example, the laser source BLU is driven with an amplitude to output a light of about 50 mW according to a grade of 0 for the right eye. Further, in the left eye frame L, for example, the laser source BLU is driven with an amplitude to output a light of 100 mW according to a grade of 7 for the left eye. However, similarly, if the amplitude is too low, a final output of light penetrating a spatial light modulation panel formed of a liquid crystal and an optical path switching unit may be too low. In this case, the output from the laser source may not be regulated by adjusting the amplitude. The output may be regulated using both the duty and the amplitude. As a result, the final output may be about 50 mW which is substantially uniform for the left eye and the right eye.

Figure 8A:
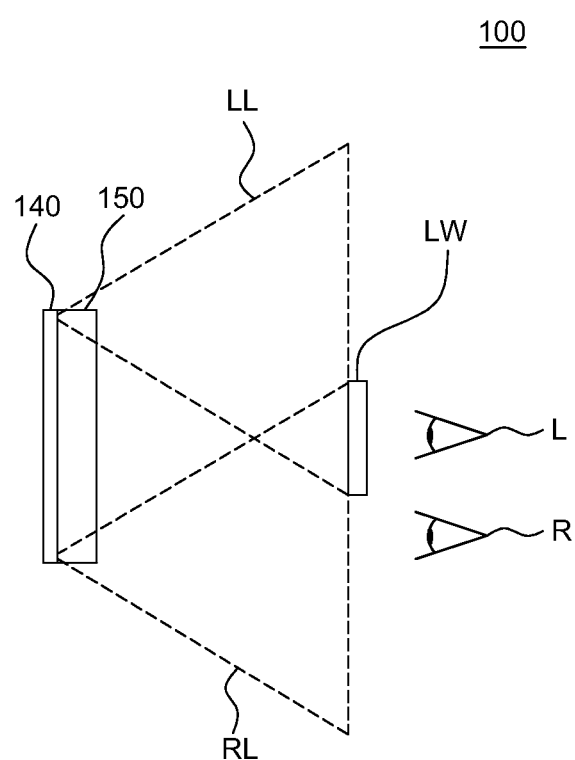
FIG. 8A to FIG. 8B are schematic diagrams provided to describe an operation of a hologram display apparatus according to an exemplary embodiment of the present invention.
Figure 8B:
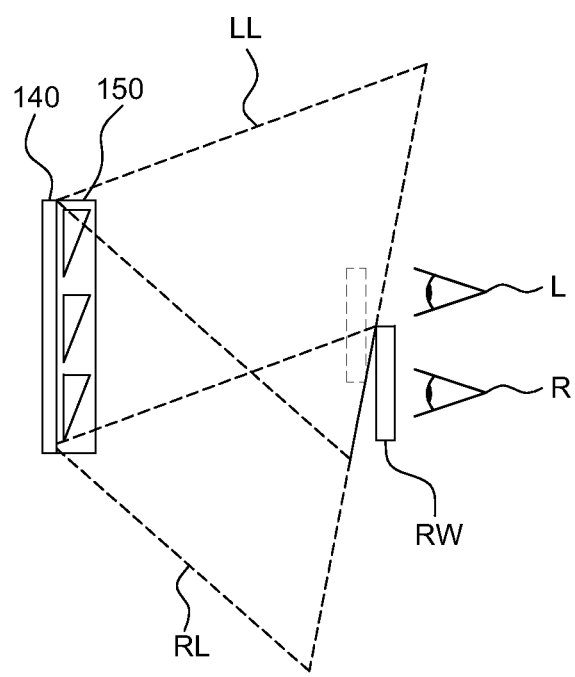

FIGS. 8A and 8B are schematic diagrams provided to describe an operation of a hologram display apparatus according to an exemplary embodiment of the present invention. FIG. 8A illustrates the hologram display apparatus 100 in which the optical path switching unit 150 refracts light penetrating the spatial light modulation panel 140 with a grade of 0 for the left eye L. FIG. 8B illustrates the hologram display apparatus 100 in which the optical path switching unit 150 refracts light with a grade of 6 for the right eye R. A left eye viewing window LW and a right eye viewing window RW are defined by lights LL and RL emitted from ends of the left side and the right side, respectively. In the hologram display apparatus 100 illustrated in FIG. 8A, an output from the laser source may not be compensated according to a grade, and in the hologram display apparatus 100 illustrated in FIG. 8B, an output from the laser source is compensated according to a grade, and, thus, luminance recognized by the right eye and the left eye may be uniform. Thus, a viewing window of the hologram display apparatus 100 may be widened, and reliability of the hologram display apparatus 100 may be improved.

Although the exemplary embodiments of the present invention have been described in detail with reference to the accompanying drawings, the present invention is not limited thereto and may be embodied in many different forms without departing from the technical concept of the present invention. Therefore, the exemplary embodiments of the present invention are provided for illustrative purposes only but not intended to limit the technical concept of the present invention. The scope of the technical concept of the present invention is not limited thereto. Therefore, it should be understood that the above-described exemplary embodiments are illustrative in all aspects and do not limit the present invention. The protective scope of the present invention should be construed based on the following claims, and all the technical concepts in the equivalent scope thereof should be construed as falling within the scope of the present invention.

What is claimed is:

1. A hologram display apparatus comprising:
   a detector configured to detect a position of a viewer;
   a spatial light modulation panel configured to modulate a light to display a hologram;
   an optical path switching unit configured to refract the light from the spatial light modulation panel based upon a grade determined by the detected position of the viewer; and
   a laser source configured to adjust an intensity of light output from the laser source on a basis of the grade determined by the detected position of the viewer so as to generate the light with a compensated output,
   wherein the grade includes a left eye-grade for a left eye of the viewer and a right eye-grade for a right eye of the viewer,
   wherein the optical path switching unit refracts the light in accordance with each of the left eye-grade and the right eye-grade respectively.

2. The hologram display apparatus according to claim 1, wherein the left eye-grade and the right eye-grade are different from each other.

3. The hologram display apparatus according to claim 2, wherein a compensated output from the laser source on the basis of the left eye-grade and a compensated output from the laser source on the basis of the right eye-grade are different from each other.

4. The hologram display apparatus according to claim 1, wherein the laser source is configured to determine the output from the laser source corresponding to the grade by using a look-up table.

5. The hologram display apparatus according to claim 1, wherein the laser source is configured to further compensate the output as the grade increases.

6. The hologram display apparatus according to claim 1, wherein the laser source compensates the output by adjusting a duty or a size.

7. The hologram display apparatus according to claim 1, wherein the optical path switching unit includes:
   a first substrate;
   a second substrate facing the first substrate;
   a driving electrode on the first substrate;
   a common electrode on the second substrate; and
   a liquid crystal unit interposed between the first substrate and the second substrate.

8. The hologram display apparatus according to claim 7, wherein the liquid crystal unit is formed of liquid crystal molecules continuously arranged in the entire liquid crystal unit.

9. The hologram display apparatus according to claim 8, wherein when a voltage is applied to the driving electrode and the common electrode and an electric field is generated, the liquid crystal molecules are arranged in multiple prism patterns according to the electric field.

10. The hologram display apparatus according to claim 1, wherein an output luminance of the light refracted in accordance with the left eye-grade is substantially the same as that of the light refracted in accordance with the right eye-grade.

11. A method for controlling a hologram display apparatus, comprising:
    detecting a position of a viewer;
    determining a grade for a left eye of the viewer and a grade for a right eye of the viewer according to the position of the viewer;
    driving a laser source to adjust an intensity of light output from the laser source on a basis of the grade for the left eye of the viewer and the grade for the right eye of the viewer determined according to the position of the viewer so as to generate a light with a compensated output; and
    applying a voltage to an optical path switching unit so as to refract the light with each of the grade for the left eye of the viewer and the grade for the right eye of the viewer respectively.

12. The method for controlling a hologram display apparatus according to claim 11, wherein the driving a laser source includes further compensating the output as the grade increases.

13. The method for controlling a hologram display apparatus according to claim 11, wherein an output luminance of the light refracted in accordance with the left eye-grade is substantially the same as that of the light refracted in accordance with the right eye-grade.

14. A display apparatus comprising:
    a detector detects a position of a viewer;
    a left eye-grade for a left eye of the viewer and a right eye-grade for a right eye of the viewer determined by the position of the viewer;
    a light source generates a light;
    a light modulation panel modulates the light to display a hologram;

an optical path switching unit refracts the light from the light modulation panel; and a controller supplies a driving voltage for driving the optical path switching unit in accordance with the left eye-grade and the right eye-grade respectively, wherein the controller controls the light source to adjust an intensity of light output from the light source on a basis of the left eye-grade for the left eye of the viewer and the right eye-grade for the right eye of the viewer determined by the position of the viewer so as to generate a light with a compensated output.

15. The display apparatus according to claim 14, wherein the left eye-grade and the right eye-grade are different from each other.

16. The display apparatus according to claim 14, wherein the optical path switching unit includes:

a first substrate;

a second substrate facing the first substrate;

a driving electrode on the first substrate;

a common electrode on the second substrate; and a liquid crystal unit interposed between the first substrate and the second substrate.

17. The display apparatus according to claim 14, wherein the display apparatus including a hologram display.

18. The display apparatus according to claim 14, wherein an output luminance of the light refracted in accordance with the left eye-grade is substantially the same as that of the light refracted in accordance with the right eye-grade.

* * * * *